United States Patent [19]

Blyler, Jr. et al.

[11] Patent Number: 5,379,358
[45] Date of Patent: Jan. 3, 1995

[54] OPTICAL SWITCH HAVING SPATIAL LIGHT MODULATORS

[75] Inventors: Lee L. Blyler, Jr., Basking Ridge; Richard J. Coyle, Jr., Lawrenceville, both of N.J.; Gary J. Grimes, Thornton, Colo.; Anthony J. Serafino, Cranbury, N.J.

[73] Assignee: AT&T Corp., Murray Hill, N.J.

[21] Appl. No.: 171,505

[22] Filed: Dec. 21, 1993

[51] Int. Cl.⁶ ................................................ G02B 6/26
[52] U.S. Cl. ...................................... 385/16; 385/24; 385/115
[58] Field of Search ................................ 385/16–24, 385/115, 120

[56] References Cited

U.S. PATENT DOCUMENTS

| | | | |
|---|---|---|---|
| 4,927,230 | 5/1990 | Tokumitsu | 385/17 |
| 4,991,924 | 2/1991 | Shankar et al. | 385/16 X |
| 5,009,477 | 4/1991 | Alferness et al. | 385/17 |
| 5,018,812 | 5/1991 | Fukuda | 385/16 |
| 5,177,804 | 1/1993 | Shimizu et al. | 385/16 X |
| 5,185,824 | 2/1993 | Grimes et al. | 385/19 |

Primary Examiner—John D. Lee
Assistant Examiner—Phan Thi Heartney
Attorney, Agent, or Firm—John C. Moran

[57] ABSTRACT

Replacing costly electro-optic or fused quartz crystalline structures or molded plastic optical waveguide splitters with an optical switch comprising an array of spatial light modulators between two relatively, thick, optical glass flats. Associated with each spatial light modulator are partial holes in the optical glass flats with the partial holes being in alignment with the spatial light modulator. Using a new experimentally-developed laser technique, these holes can be drilled to a precise depth so that the distance between the ends of standard silica optical fibers inserted into opposing holes approximates the diameter of those fibers. Since the diameter of a partial hole is insignificant compared to the overall area of an optical glass flat, the physical strength of the optical glass flats is not reduced even when a number of partial holes are drilled into the optical glass flats. In addition, since thick optical glass flats are used, the contrast ratio and switching speed of such an optical switch is not impaired.

12 Claims, 3 Drawing Sheets

OPTICAL SWITCH HAVING SPATIAL LIGHT MODULATORS

TECHNICAL FIELD

The present invention relates to an optical switch capable of efficiently switching light from standard silica fibers.

BACKGROUND OF THE INVENTION

Prior art photonic switching systems have used a plurality of planar devices to provide optical splitting and combining capabilities. One such arrangement, disclosed in U.S. Pat. No. 5,009,477, forms a crossbar switch having a stack of M splitter plates, each of which routes an injected optical signal to one of N outputs, and a stack of N combiner plates, each of which routes the signal of a selected one of the M inputs to a common output. Each splitter and combiner plate is formed from electro-optic elements, such as lithium niobate substrates. Another such switching arrangement, disclosed in a NASA Tech. Brief, dated September, 1990, employs an electronic shutter element wherein each electronic shutter in an array of such shutters can either be transparent or opaque to an optical signal. The electronic shutter element is planar and is disposed between optical signal splitting and signal combining devices. The signal splitting and combining devices are formed by etching quartz crystalline wafers.

The problem with the above-described structures is that they are quite expensive and utilize brittle, rigid materials which cannot meet the shock and vibration objectives of a number of optical switching applications.

U.S. Pat. No. 5,185,824 overcomes the above-mentioned problem by replacing the costly electrical-optic or fused quartz crystalline structures with molded plastic optical waveguide splitters and combiners. The optical switch is formed by arranging a stack of optical splitters and disposing this stack on one side of an electronic shutter element having an array of shutters. A similar stack of splitter elements is arranged, rotated 90 degrees with respect to the optical splitter stack and disposed on the other side of the electronic shutter element. The resulting switching structure provides an inexpensive, rugged device. However, this method is limited to use with highly collimated light beams or very large (approximately one millimeter in diameter), low bandwidth fibers. The reason is that, when used to switch light between pairs of fibers butted against optical flats on each side of the electronic shutter element, unless the fiber diameter is substantial compared with the thickness of the switching device which includes the optical flats, light collection efficiency is very low unless very expensive optics are used. The reason being that the diameters of standard silica fibers is very small compared with the thickness of optical flats required for high contrast switching elements. This problem can be resolved by utilizing expensive optics in the form of lenses on each end of the optical fibers. A second solution is the use of very large plastic optical fibers. Even so, optical losses are high and the low band width of these fibers will require optical-electrical-optical conversion at both the input and output stages. A third solution is to use very thin glass plates to get the fiber diameter/switch thickness ratio up. This suffers from the disadvantage that the contrast ratio and switching speed of the devices are impaired by the use of thin plates which are necessarily not as flat as the thicker plates. To make the optical plates thin enough to be used with standard multi-mode or single mode silica fibers would render the devices useless.

There exists then a need in the art for an optical switch that utilizes spatial light modulators which is inexpensive and physically strong and which can be utilized with the smaller diameter silica optical fibers.

SUMMARY OF THE INVENTION

The present invention overcomes the problems of the prior art by replacing the costly electro-optic or fused quartz crystalline structures and molded plastic optical waveguide splitters with an optical switch comprising an array of spatial light modulators between two relatively, thick, optical glass flats which are referred to as a first and second optical flats. The resulting switch array is used for switching optical signals from a first plurality of optical fibers to a second plurality of optical fibers. Associated with each spatial light modulator are partial holes in the optical glass flats with the partial holes being in alignment with the spatial light modulator. Using an experimentally-developed laser technique, these holes can be drilled to a precise depth so that the distance between the ends of standard silica optical fibers inserted into opposing holes is less than the diameter of those fibers. In the present invention, since the diameter of a partial hole and the number of holes are insignificant compared to the overall area of an optical glass flat, the physical strength of the optical glass flats is not reduced even when a number of partial holes are drilled into the optical glass flats. In addition, since thick optical glass flats are used, the contrast ratio and switching speed of such an optical switch is not impaired.

A spatial light modulator of the liquid crystal type requires that the light emitted from a optical fiber to a spatial light modulator be polarized. In the prior art, this required each optical fiber to be hand tuned by rotating the fiber. Advantageously, one embodiment of the invention solves this problem by using the first and a third optical glass flats on one each side of the array of spatial light modulators and the second and a fourth optical flat on the other side. The first optical flat is in contact with the spatial light modulators and has partial holes drilled in it; and the third optical flat has holes drilled through that optical flat. The holes of the first and third optical glass flats are in alignment with each other. A sheet of thin polarizing material is inserted between the optical glass flats. When a fiber is inserted through a hole in the third optical glass flat and into the partial hole of the first optical glass flat, the polarizing material is die cut as the fiber is seated into the partial hole. This technique assures that light emerging from an optical fiber to a spatial light modulator has the correct polarization. The addition of the third optical glass flat adds to the physical strength of the resulting optical switch and provides strain relief for the attached optical fibers. The second and fourth optical flats are used in a similar manner.

In a second embodiment of the invention, single mode, polarization preserving, optical fibers are used to assure correct polarization of light.

DETAILED DESCRIPTION

Figure 1:
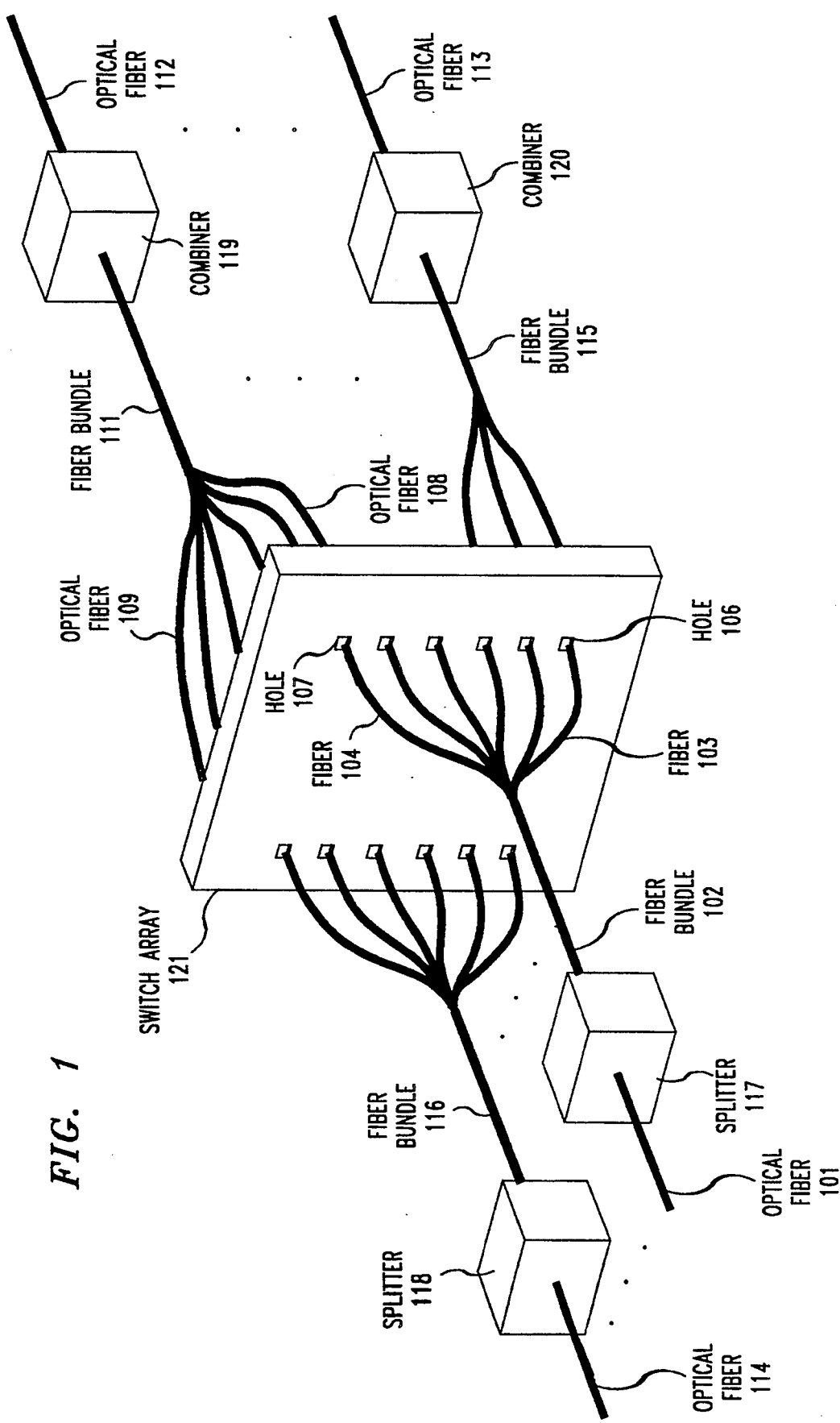
FIG. 1 shows a perspective view of an optical switch in accordance with the invention.

FIG. 1 illustrates an optical switch in accordance with the invention. Optical signals to be switched through switching array 121 are received via input optical fibers such as optical fibers 101 and 114. A signal transmitted on optical fiber 101 is received by splitter 117 which splits that signal and outputs it via fibers contained within fiber bundle 102. For example, optical fibers 103 and 104 are contained within fiber bundle 102. Splitter 118 performs a similar function with respect to optical fiber 114 and fiber bundle 116.

The optical fibers of fiber bundle 102 are arranged along a vertical column of spatial light modulators in switch array 121. On the opposite side of switch array 121, the optical fibers from a fiber bundle are arranged along a horizontal row of spatial light modulators within switch array 12 I. For example, the optical fibers from fiber bundle 111 are arranged along the top most horizontal row of spatial light modulators.

For example, optical signals that are received on optical fiber 101 are switched to optical fiber 112 in the following manner. Splitter 117 is responsive to the optical signals to transmit these optical signals in all optical fibers of fiber bundle 102. The spatial light modulator associated with optical fibers 104 and 108 is activated to allow the communication of the optical signals from optical fiber 104 to optical 108. Combiner 119 is responsive to the optical signals received via optical fiber 108 in fiber bundle 111 to retransmit these optical signals on optical fiber 112.

Figure 2:
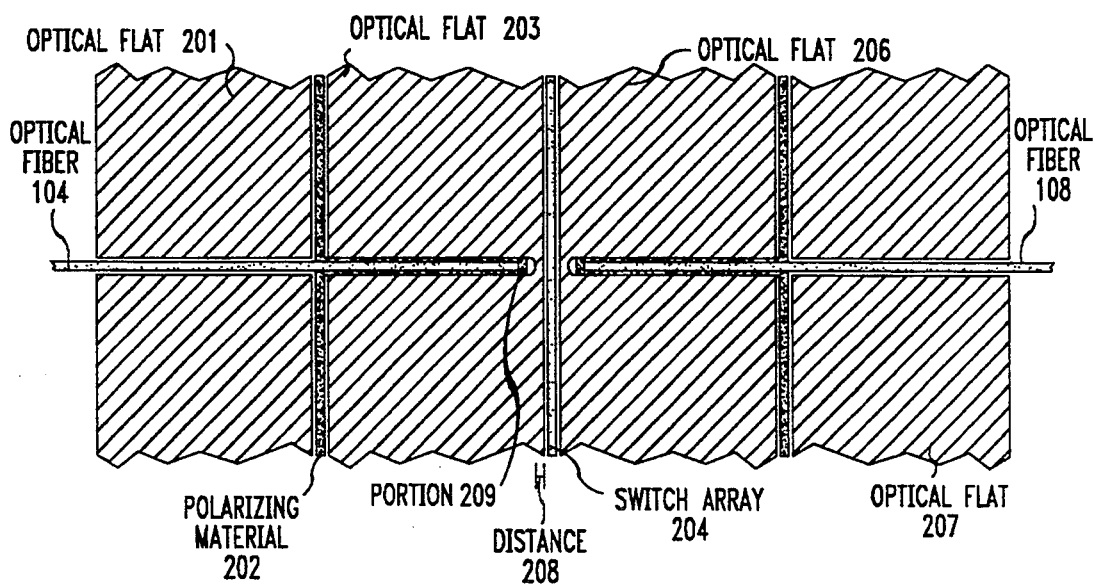
FIG. 2 illustrates a portion of the switch array of FIG. 1.

FIG. 2 illustrates a portion of switch array 121 with optical fibers 104 and 108 inserted. As will be explained in greater detail with respect to FIG. 3, portion 209 is part of the polarizing material 202 that was cut and retained on the end of optical fiber 104 when optical fiber 104 was inserted into the partial hole illustrated in optical flat 203. A similar portion of polarizing material is cut by optical fiber 108. Distance 208 represents the remaining portion or thickness of glass between the end of portion 209 and switch array 204.

Switch array 204 comprises a plurality of spatial light modulators, and one such modulator is aligned with the ends of optical fiber 104 and 108 as illustrated in FIG. 2 and communicate or block light from optical fiber 104 to optical fiber 108. These spatial light modulators may advantageously be ferroelectric liquid crystal spatial light modulators. The manner in which an array of such modulators is fabricated is well known in the art.

Figure 3:
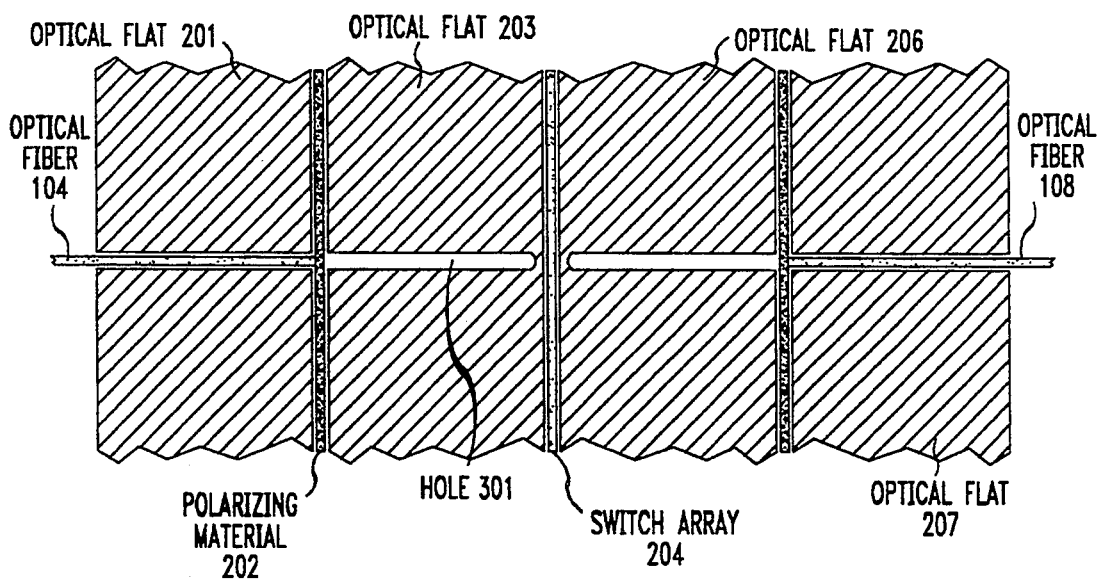
FIG. 3 illustrates a portion of the switch array of FIG. 1, before the light transmitting optical fiber is fully inserted.

FIG. 3 illustrates a step in the process of making the final product illustrated in FIG. 2. In FIG. 3, optical fiber 104 is shown as having been inserted up to polarizing material 202. An optical medium having the same index of refraction of the optical flat is first injected into hole 301. Then, optical fiber 104 is shoved into hole 301. When optical fiber 104 is shoved into hole 301, a portion of the polarizing material 202 is cut off by the end of optical fiber 104 and remains in front of optical fiber 104 until it achieves the position illustrated in FIG. 2. The same operation is performed with respect to optical fiber 108.

In a second embodiment, the polarizing sheets of material are not placed between optical flat 201 and optical flat 203 and between optical flat 206 and optical flat 207. Instead, all of optical fibers terminating on switch array 121 of FIG. 1 are single mode, polarization preserving, optical fibers that are properly rotated before being inserted into the optical flats.

In a third embodiment, the polarizing sheets of material also are not placed between optical flat 201 and optical flat 203 and between optical flat 206 and optical flat 207. Instead, pre-cut pieces of the polarizing material are placed on all of optical fibers terminating on switch array 121 of FIG. 1 before those fibers are inserted into the optical flats. After insertion, the optical fibers are properly rotated in the optical flats.

Figure 4:
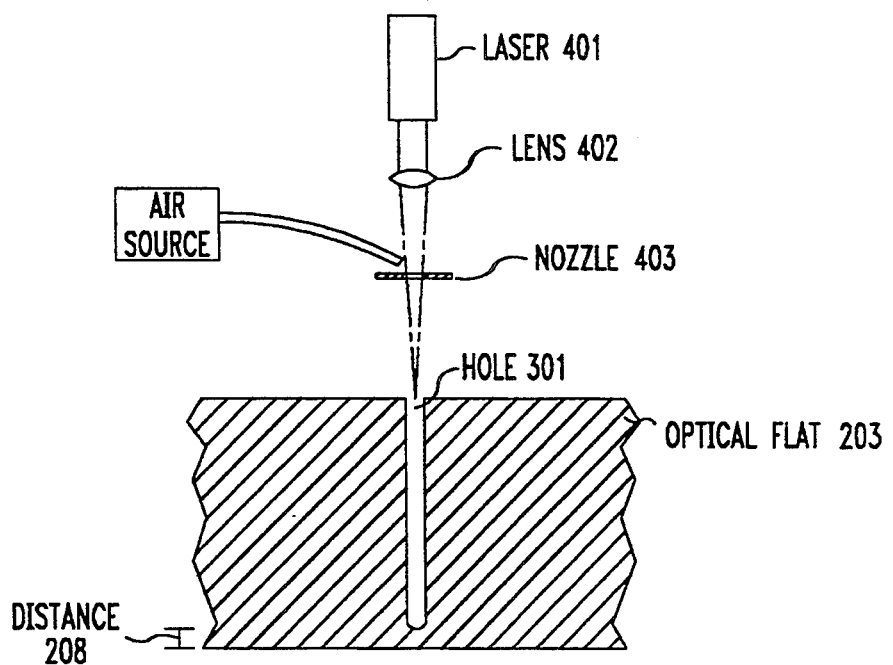
FIG. 4 illustrates, in a block diagram form, a laser for producing partial holes in an optical flat.

FIG. 4 illustrates, in a block diagram form, the use of laser 401 to produce hole 301 in optical flat 203. Laser 401 may advantageously be a Model 108 $CO_2$ laser which is manufactured by Photon Sources. Laser 401 is used in conjunction with lens 402 which has a nominal 38 millimeter focal length. Between lens 402 and optical flat 203, is nozzle 403 that has a 2 millimeter diameter hole through which light from lens 402 passes. Air is forced through nozzle 403 at 5 psi to prevent contamination of lens 402 during the drilling of optical flat 203. Using an optical system configured in this manner, a hole having approximately a 125 micron diameter can be made in a 1.6 millimeter thick optical flat to a depth of approximately 147.5 microns with pulse widths vary from 1.0 to 3.5 milliseconds and the pulse energy ranging from 0.15 to 0.43 joules. As is well known in the art, optical flat 203 could be mounted on a XY cable and be shifted under laser 401 to drill an array of partial holes such as hole 301.

It is to be understood that the above-described embodiments are merely illustrative of principles of the invention and that other arrangements may be devised by those skilled in the art without departing from the spirit or scope of the invention.

We claim:

1. An optical switching array for switching optical signals from a first plurality of optical fibers to a plurality of second optical fibers, comprising:

an array of spatial light modulators;

a first and second optical flats each positioned on an individual side of the array of spatial light modulators and each of the first and second optical flats having an array of partial holes that are aligned with similar partial holes of the other one of the optical flats and the array of spatial light modulators and each of the partial holes is to a depth such that a remaining thickness of material of the optical flat is approximately equal to the smallest diameter of any one of the optical fibers of the first and second pluralities of optical fibers where the diameter includes the core and cladding; and each of the first plurality of optical fibers positioned in an individual partial hole of the first optical flat and each of the second plurality of optical fibers positioned in an individual partial hole of the second optical flat whereby one of array of spatial light modulators may communicate or block the optical signals from one of the first plurality of optical fibers aligned with the one of the array of spatial light modulators to one of the second plurality optical fibers also aligned with the one of array of spatial light modulators.

2. The optical switching array of claim 1 further comprises a third and fourth optical flats each with an array of holes completely through each and each array of holes also aligned with the array of spatial light modulators and the third optical flat placed against the first optical flat and the fourth optical flat placed against the second optical flat and each of the first plurality of optical fibers placed through an individual hole of the third optical flat into the aligned partial hole of the first optical flat and each of the second plurality of optical fibers placed through an individual hole of the fourth optical flat into the aligned partial hole of the second optical flat.

3. The optical switching array of claim 2 further comprises a sheet of polarizing material placed between the first and third optical flats such that when one of the first optical fibers is placed through a hole of the third optical flat and into a partial hole of the first optical flat a portion of the sheet of polarizing material is freed from the sheet and becomes positioned between the end of the one of the first optical fibers and the bottom of the partial hole of the first optical flat.

4. The optical switching array of claim 1 wherein the optical fibers have a diameter including core and cladding ranging from 125 microns to 200 microns.

5. The optical switching array of claim 4 further comprises an optical media in each of the partial holes of the arrays of partial holes where the optical media matches the index of refraction of the first and second optical flats.

6. The optical switching array of claim 2 wherein the optical fibers are single mode, polarization preserving, optical fibers that are properly oriented in the arrays of holes with respect to switching characteristics of the array of spatial light modulators.

7. A method for fabricating an optical switching array that switches optical signals from a first plurality of optical fibers to a second plurality of optical fibers, comprising the steps of:

drilling an array of partial holes in a first optical flat and an array of partial holes in a second optical flat where each of the partial holes is to a depth such that a remaining thickness of material of the optical flat is approximately equal to the smallest diameter of any one of the optical fibers of the first and second pluralities of optical fibers where the diameter includes the core and cladding;

placing the first and second optical flats each on an individual side of an array of spatial light modulators;

positioning each of the first plurality of optical fibers in an individual partial hole of the first optical flat and positioning each of the second plurality of optical fibers in an individual partial hole of the second optical flat whereby one of the array of spatial light modulators may communicate or block the optical signals from one of the first plurality of optical fibers aligned with the one of the array of spatial light modulators to one of the second plurality optical fibers also aligned with the one of array of spatial light modulators.

8. The method of claim 7 further comprises the steps of drilling an array of holes through a third optical flat and an array of holes through a fourth optical flat:

placing the third optical flat against the first optical flat so that the array of partial holes of the first optical flat are aligned with the array of holes of the third optical flat and fourth optical flat against the second optical flat so that the array of partial holes of the second optical flat are aligned with the array of holes of the fourth optical flat the step of positioning the first plurality of optical fibers further comprises the step of passing each of the first plurality of optical fibers through an individual hole of the third optical flat and the step of positioning the second plurality of optical fibers further comprises the step of passing each of the second plurality of optical fibers through an individual hole of the fourth optical flat.

9. The method of claim 8 further comprises placing a sheet of polarizing material between the first and third optical flats;

the step of passing the first optical fibers through the holes of the third optical flat and into a partial hole of the first optical flat comprises the step of freeing a portion of the sheet of polarizing material from the sheet that portion becomes positioned between the end of the one of the first optical fibers and the bottom of the partial hole of the first optical flat.

10. The optical switching array of claim 8 wherein the optical fibers are single mode, polarization preserving and the steps of positioning the optical fibers further comprise the steps of properly orienting the optical fibers in the arrays of holes with respect to switching characteristics of the array of spatial light modulators.

11. The optical switching array of claim 7 wherein the optical fibers have a diameter including core and cladding ranging from 125 microns to 200 microns.

12. The method of claim 11 further comprises the step of placing an optical media in each of the partial holes of the arrays of partial holes before positioning of the optical fibers where the optical media substantially matches the index of refraction of the first and second optical flats.

* * * * *